US009002810B1

(12) United States Patent
Van Rotterdam et al.

(10) Patent No.: US 9,002,810 B1
(45) **Date of Patent: *Apr. 7, 2015**

(54) METHOD AND SYSTEM FOR MANAGING VERSIONED STRUCTURED DOCUMENTS IN A DATABASE

(75) Inventors: Jeroen Mattijs Van Rotterdam, Berkeley, CA (US); Ewout Graswinckel, Delft (NL)

(73) Assignee: EMC Corporation, Hopkinton, MA (US)

( * ) Notice: Subject to any disclaimer, the term of this patent is extended or adjusted under 35 U.S.C. 154(b) by 66 days.

This patent is subject to a terminal disclaimer.

(21) Appl. No.: 13/338,553

(22) Filed: Dec. 28, 2011

(51) Int. Cl.
*G06F 17/30* (2006.01)

(52) U.S. Cl.
CPC ................................ *G06F 17/30548* (2013.01)

(58) Field of Classification Search
USPC .......................... 707/638, 695, 706, 802, 807
See application file for complete search history.

(56) References Cited

U.S. PATENT DOCUMENTS

| | | | | |
|---|---|---|---|---|
| 8,001,156 | B2 * | 8/2011 | Hughes | 707/802 |
| 8,015,165 | B2 * | 9/2011 | Idicula et al. | 707/695 |
| 8,095,577 | B1 * | 1/2012 | Faibish et al. | 707/823 |
| 2002/0010637 | A1 * | 1/2002 | Lieu et al. | 705/26 |
| 2003/0046307 | A1 * | 3/2003 | Rivette et al. | 707/104.1 |
| 2004/0194016 | A1 * | 9/2004 | Liggitt | 715/501.1 |
| 2008/0104141 | A1 * | 5/2008 | McMahon | 707/203 |
| 2008/0282065 | A1 * | 11/2008 | Imamichi | 712/208 |
| 2011/0302195 | A1 * | 12/2011 | Cai et al. | 707/769 |

* cited by examiner

*Primary Examiner* — Jorge A Casanova
(74) *Attorney, Agent, or Firm* — Dergosits & Noah LLP; Todd A. Noah

(57) ABSTRACT

A method for providing a query for searching over versions of a structured document includes providing a plurality of versioned nodes (vNodes) representing a plurality of objects of at least one version of a structured document. Each vNode includes versioning information associated with at least one version of the structured document and collectively, the vNodes graphically represent the version(s) of the structured document in a versioned document object model ("vDOM") node tree. In an embodiment, a query for at least one version of the structured document is received. The query includes a versioned function (vFunction) having at least one argument relating to versioning information associated with one or more versions of the structured document. The vFunction is processed to identify a version of the structured document that includes an object represented by a vNode having versioning information satisfying the query.

20 Claims, 8 Drawing Sheets

200

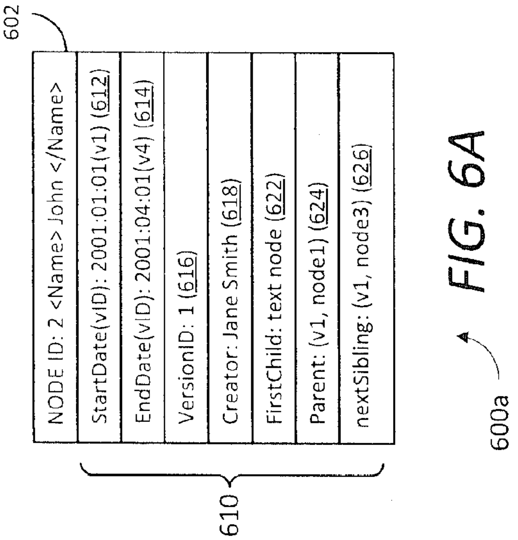

FIG. 6A

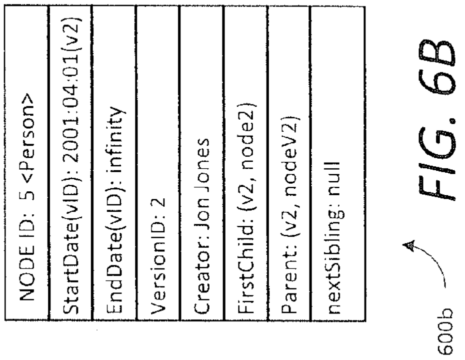

FIG. 6B

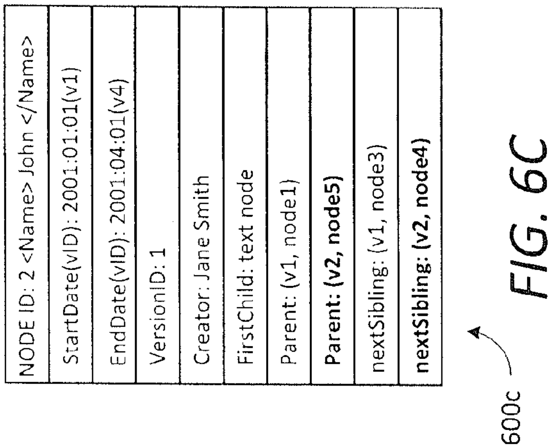

FIG. 6C

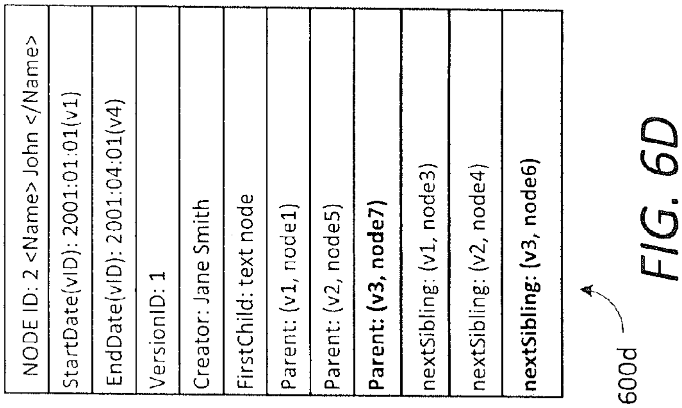

FIG. 6D

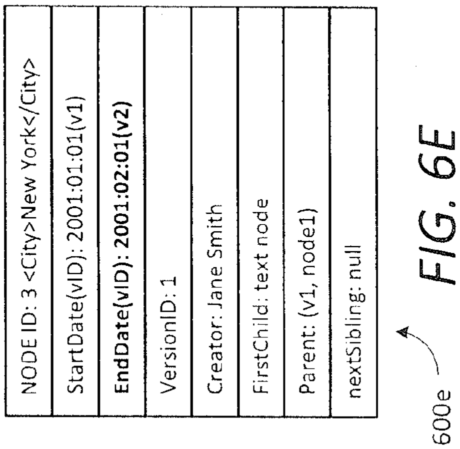

FIG. 6E

FIG. 6A — 600a (602)
- NODE ID: 2 <Name> John </Name>
- StartDate(vID): 2001:01:01(v1) (612)
- EndDate(vID): 2001:04:01(v4) (614)
- VersionID: 1 (616)
- Creator: Jane Smith (618)
- FirstChild: text node (622)
- Parent: (v1, node1) (624)
- nextSibling: (v1, node3) (626)

{ 610 }

FIG. 6B — 600b
- NODE ID: 5 <Person>
- StartDate(vID): 2001:04:01(v2)
- EndDate(vID): infinity
- VersionID: 2
- Creator: Jon Jones
- FirstChild: (v2, node2)
- Parent: (v2, nodeV2)
- nextSibling: null

FIG. 6C — 600c
- NODE ID: 2 <Name> John </Name>
- StartDate(vID): 2001:01:01(v1)
- EndDate(vID): 2001:04:01(v4)
- VersionID: 1
- Creator: Jane Smith
- FirstChild: text node
- Parent: (v1, node1)
- Parent: (v2, node5)
- nextSibling: (v1, node3)
- nextSibling: (v2, node4)

FIG. 6D — 600d
- NODE ID: 2 <Name> John </Name>
- StartDate(vID): 2001:01:01(v1)
- EndDate(vID): 2001:04:01(v4)
- VersionID: 1
- Creator: Jane Smith
- FirstChild: text node
- Parent: (v1, node1)
- Parent: (v2, node5)
- Parent: (v3, node7)
- nextSibling: (v1, node3)
- nextSibling: (v2, node4)
- nextSibling: (v3, node6)

FIG. 6E — 600e
- NODE ID: 3 <City>New York</City>
- StartDate(vID): 2001:01:01(v1)
- EndDate(vID): 2001:02:01(v2)
- VersionID: 1
- Creator: Jane Smith
- FirstChild: text node
- Parent: (v1, node1)
- nextSibling: null

900

960

970

| Versioned Index (950) | | | |
|---|---|---|---|
| Content (962) | vNodeID (964) | StartDate (vID) (966) | EndDate (vID) (968) |
| "John" | 2 | 2001:01:01 (v1) | 2001:04:01 (v4) |
| "New York" | 3 | 2001:01:01 (v1) | 2001:02:01 (v2) |
| "London" | 4 | 2001:01:01 (scaled) | 2001:06:01 (scaled) |
| "Paris" | 6 | 2001:03:01 (v4) | 2001:05:01 (v5) |
| "New York" | 14 | 2001:02:01 (v2) | infinity |
| ⋮ | ⋮ | ⋮ | ⋮ |

970a, 970b, 970c, 970d, 970e

METHOD AND SYSTEM FOR MANAGING VERSIONED STRUCTURED DOCUMENTS IN A DATABASE

BACKGROUND

Structured documents have nested structures, i.e., structures that define hierarchical relationships between elements of a document. Documents written in Extensible Markup Language (XML) are structured documents. Typically, a structured document can be represented by a data model comprising a plurality of hierarchical nodes that form a "node tree" comprising a root node, branch nodes and leaf nodes. The term "node" is used in the Direct Object Model (DOM)-sense, which is a standard XML construct well known to those skilled in the art. In the DOM construct certain hierarchical rules apply. For example, every node, aside from a root node, has one parent node. In addition, a node can have zero or at least one child node. Accordingly, a child node can have zero or multiple siblings, but only one next sibling if it has siblings at all. Typically, a node with content in its first child node is referred to as a "leaf" node.

As applied, each node in the DOM construct corresponds to an object of the XML document. Each node can be described by a path that defines the hierarchical relationship between the node and its parent node. Every path begins at a root node corresponding to a root object and follows the hierarchical structure defined by the XML document. Throughout this description, the term "node" is used interchangeably with the term "object."

As more and more business applications create and use structured documents, the challenge is to store, search, and retrieve these documents. Database management systems (DBMS) are available that are configured to receive and store structured documents in their native format. For example, EMC Documentum xDB, developed by EMC Corporation of Hopkinton, Mass., is a high-performance and scalable native XML DBMS that can store and manage structured documents in their native format, e.g., as a nested data model according to the DOM construct. Typically, the XML DBMS can parse a structured document into its objects and can generate nodes representing the objects of the document so that the nodes can be stored in the database. By doing so, the XML DBMS allows database structures to be easily modified to adapt to changing information requirements.

As discussed above, the DOM construct provides a useful and efficient data model for representing a structured document and is essential for implementing the XML DBMS. Nevertheless, disadvantages are inherent. For example, because every document is represented by a corresponding DOM, a change to an existing document requires a new DOM to be generated and stored for the modified, but new, document. When changes to a document are minor, e.g., correcting a spelling error or adding a citation, storing multiple DOMs for documents that are essentially identical leads to redundancy and waste. In an attempt to minimize this redundancy, an older version of a document can be stored as a delta of a newer version of the document. Nonetheless, with this approach, the context of the older version of the document is lost and therefore traversing and/or querying the older version is very difficult, if not possible.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

FIGS. 6A-6E are block diagrams illustrating exemplary versioned nodes according to an embodiment;

DETAILED DESCRIPTION

Figure 1:
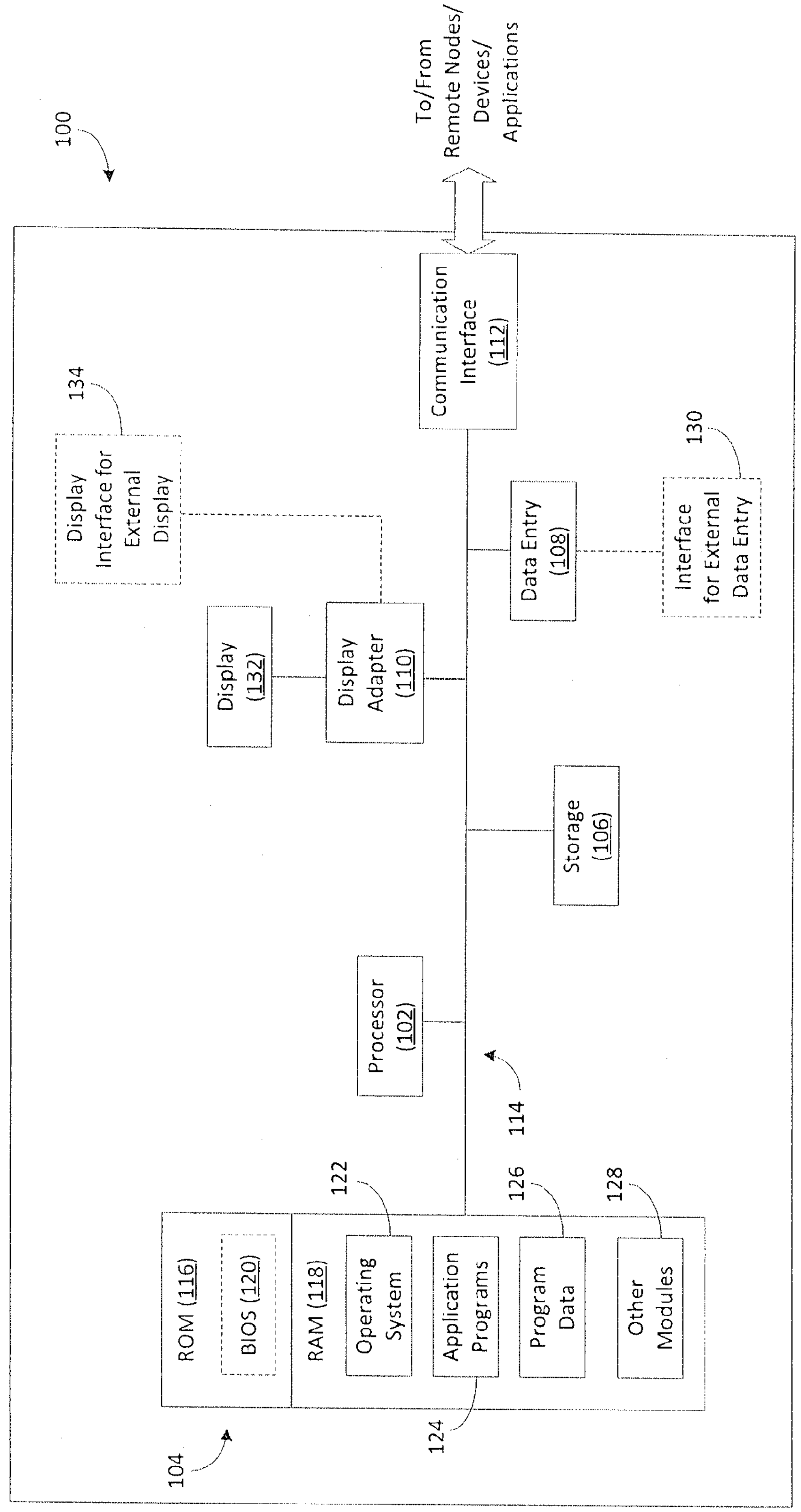
FIG. 1 is a block diagram illustrating an exemplary hardware device in which the subject matter may be implemented.

The subject matter presented herein provides a system and method for managing versioned structured documents in a native XML database and in particular, for indexing and searching versioned structured documents in a native XML database more efficiently.

According to an embodiment, a versioned DOM ("vDOM") construct is provided to represent multiple versions of a structured document in a single tree structure referred to as a "vDOM node tree." In an embodiment, the vDOM node tree comprises a plurality of versioned nodes (vNodes) that, unlike traditional DOM nodes, include versioning information associated with at least one version of the structured document. Thus, modifications to the document can be represented in the vDOM node tree while maintaining the document context of each version of the document. According to an embodiment, the vDOM construct allows a vNode to have more than one parent node and more than one next sibling node. Therefore, vNodes can be shared across multiple versions of the structured document thereby reducing redundancy and storage inefficiencies.

According to an embodiment, when a structured document is first received, vNodes are generated for each object in the structured document and stored in a data store, where collectively, the vNodes represent the structured document. When a new version of the structured document is received and includes a modification to an object, a new vNode is generated only for selected objects based on their hierarchical relationship to the modified object. The other vNodes are either unchanged or updated based on their hierarchical relationship to the selected objects and/or to the modified object. When processing of the new version of the document is completed, multiple versions of the structured document can be graphically represented by the existing, new and updated vNodes in a single vDOM node tree.

According to an embodiment, the vNodes of a versioned structured document can be stored in a database that is managed by a versioned XML ("vXML") DBMS. Typically, users can retrieve documents and/or their content by submitting a query to the XML DBMS. The query received and processed by the standard XML DBMS conforms to an open standard language construct known as "XQuery" specified by the World Wide Web Consortium ("W3C") XML Query Recommendations. XQuery, however, does not support version specific functionality. To address this deficiency, according to another embodiment, a versioned function ("vFunction") is provided to support querying over versioned structured documents stored in the vXML database. In an embodiment, the vFunction is an extension of XQuery, and includes at least one argument relating to versioning information of a versioned structured document. By providing the vFunction, the vXML DBMS can be configured to perform a version-specific search to identify a vNode having versioning information satisfying the argument(s) of the vFunction. Once the vNode is identified, the vDOM node tree can be traversed to retrieve at least one version of the structured document that satisfies the query.

According to another embodiment, in order to optimize the search and retrieval functionality, a versioned index ("vIndex") is provided. In an embodiment, index keys that include information relating to versioning information of a versioned structured document are generated for at least some vNodes of the document. The index keys are then stored in the vIndex so that a version-specific query for information from or pertaining to a specified version(s) of the structured document can be processed more quickly and efficiently.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a physical or virtual hardware device 100, including a processing unit 102, memory 104, storage 106, data entry module 108, display adapter 110, communication interface 112, and a bus 114 that couples elements 104-112 to the processing unit 102. While many elements of the described hardware device 100 can be physically implemented, many if not all elements can also be virtually implemented by, for example, a virtual computing node.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the physical or virtual hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the physical or virtual hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

Figure 2:
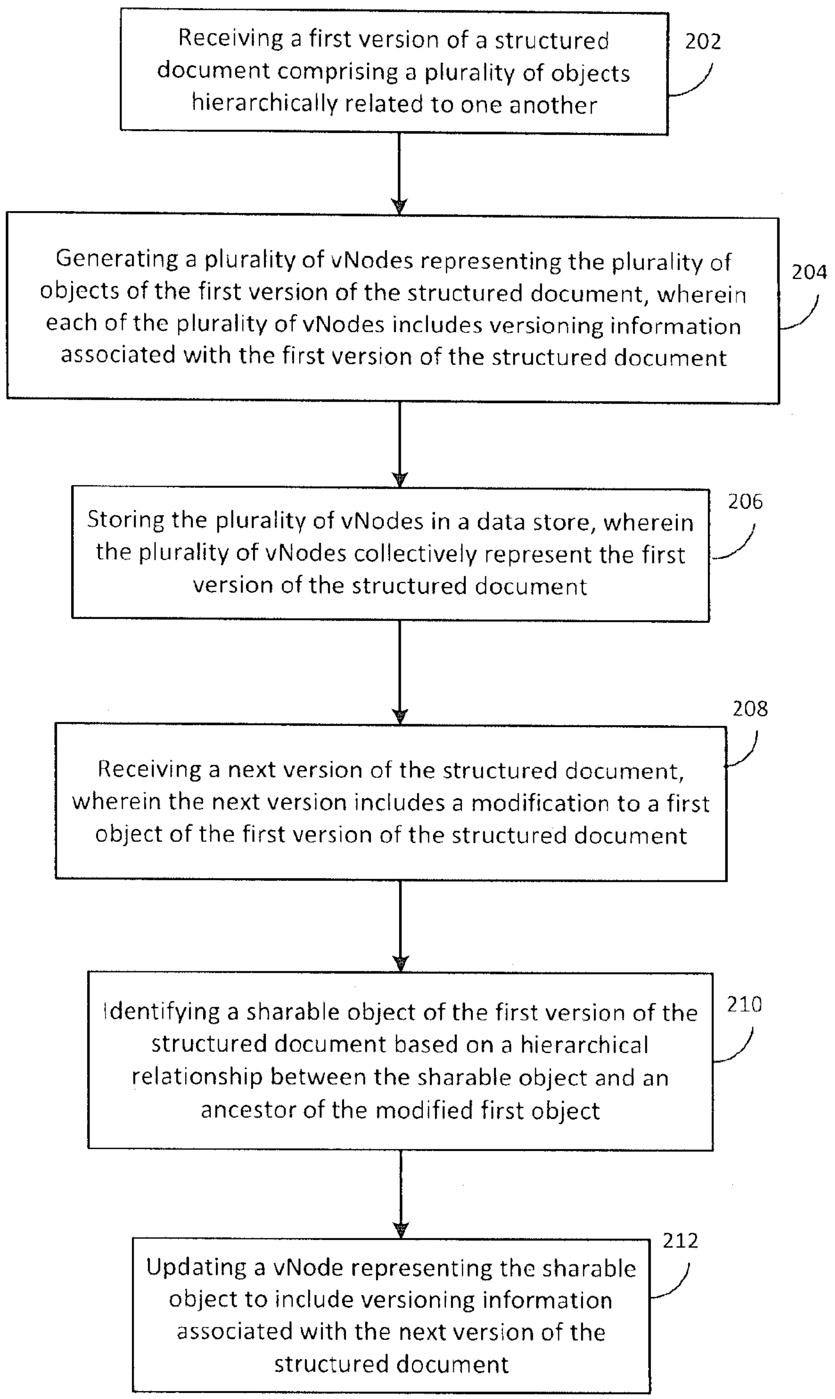
FIG. 2 is a flow diagram illustrating an exemplary method for storing multiple versions of a structured document according to an exemplary embodiment.
Figure 3:
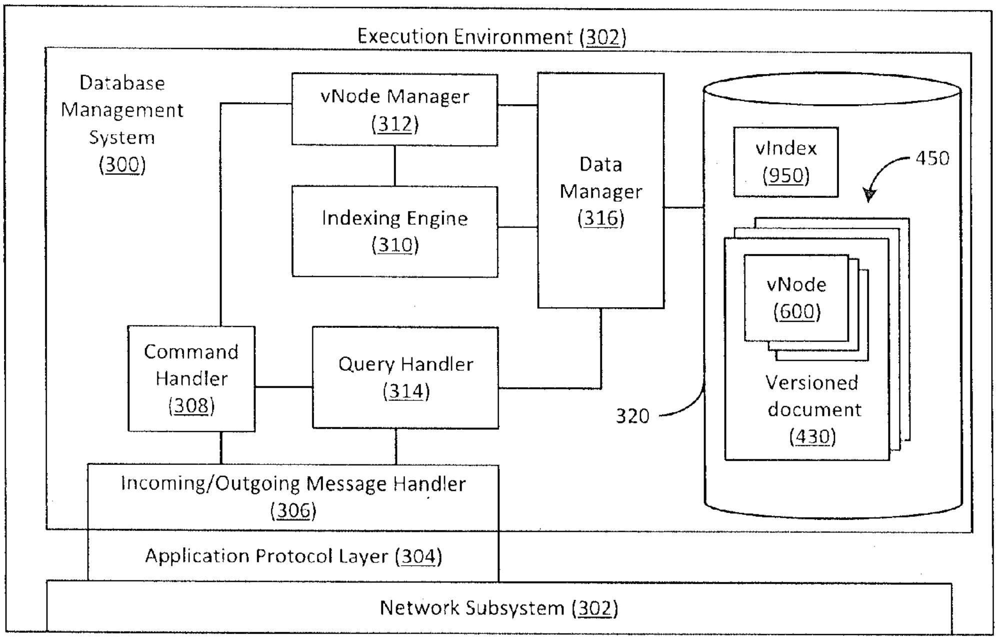
FIG. 3 is a block diagram illustrating an exemplary system for managing structured documents according to an exemplary embodiment.

Referring now to FIG. 2, a flow diagram is presented illustrating a method for storing multiple versions of a structured document according to an exemplary embodiment. FIG. 3 is a block diagram illustrating an exemplary system for managing structured documents in a database according to embodiments of the subject matter described herein. The method 200 illustrated in FIG. 2 can be carried out by, for example, at least some of the components in the exemplary arrangement of components illustrated in FIG. 3. The arrangement of components in FIG. 3 may be implemented by some or all of the components of the physical or virtual hardware device 100 of FIG. 1.

Figure 4:
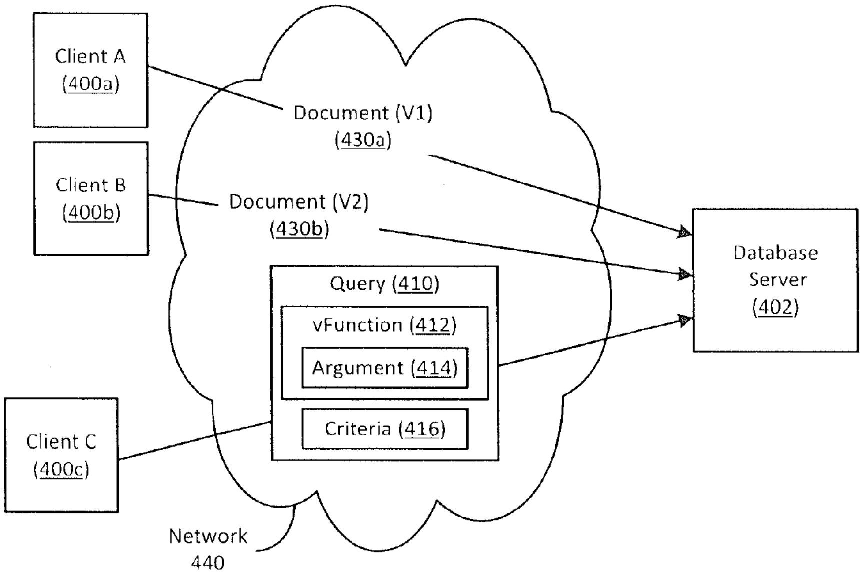
FIG. 4 is a block diagram illustrating a network in which a system for managing structured documents can be implemented.

FIG. 3 illustrates components that are configured to operate within an execution environment hosted by a computer device and/or multiple computer devices, as in a distributed execution environment. For example, FIG. 4 illustrates a plurality of computer devices 400*a*-400*c*, 402 communicatively coupled to one another via a network 440, such as the Internet, where a database server 402 can be configured to provide an execution environment configured to support the operation of the components illustrated in FIG. 3 and/or their analogs. Exemplary computer devices can include physical or virtual desktop computers, physical or virtual servers, networking devices, tablet or notebook computers, mobile phones, and the like.

Illustrated in FIG. 3 is a DBMS 300 including components adapted for operating in an execution environment 302. The execution environment 302, or an analog, can be provided by a physical or virtual computer device such as the database server 402. The DBMS 300 includes a data store 320, such as a database, that is configured to store a plurality of versioned structured documents 430 in their native format. The data store 320 is managed by a data manager 316, which can be configured to receive, add, remove, and/or retrieve structured documents 430 from the data store 320. A query handler 314 can be configured to receive and process data queries 410 and to invoke the data manager 316 to retrieve information satisfying the data queries 410. According to an embodiment, the DBMS 300 can be an vXML DBMS and the structured documents 430 can be XML documents.

With reference to FIG. 2, in block 202, a first version of a structured document is received. In an embodiment, the structured document comprises a plurality of objects hierarchically related to one another. A system for managing versioned structured documents includes means for receiving the first version of a structured document. For example, FIG. 3 illustrates a command handler component 308 in the DBMS 300 configured to receive the first version 430*a* of the structured document 430 that comprises a plurality of objects hierarchically related to one another.

According to an embodiment, the first version 430*a* of the structured document 430 can be included in a message transmitted from a client device, e.g., client A 400*a*, to the database server 402 over the network 440. The message can include a command to check-in or store the document 430*a* in the data store 320. In an embodiment, the command handler component 308 in the DBMS 300 can be configured to receive the message including the first version 430*a* of the structured document 430 from client A 400*a* via a network subsystem 302 and optionally an application protocol layer 304 that can encode, package, and/or reformat data for sending and receiving messages over a network layer, such as Internet Protocol (IP), and/or a transport layer, such as Transmission Control Protocol (TCP) and/or User Datagram Protocol (UDP).

Referring again to FIG. 2, when the first version 430*a* of the structured document is received, a plurality of versioned nodes ("vNodes") representing the plurality of objects of the first version 430*a* of the structured document is generated in block 204. According to an embodiment, each of the plurality of vNodes includes versioning information associated with the first version 430*a* of the structured document. In the system for managing versioned structured documents 430, a vNode manager component 312 in the DBMS 300 hosted by the database server 402 can be configured to generate a plurality of vNodes 600 representing the plurality of objects of the first version 430*a* of the structured document 430, wherein each of the plurality of vNodes 600 includes versioning information associated with the first version 430*a* of the structured document.

According to an embodiment, when the message is received, the command handler component 308 can be configured to extract the first version 430*a* of the structured document from the message and to route the structured document 430*a* to the vNode manager component 312 based on the command included in the message.

Figure 5A:
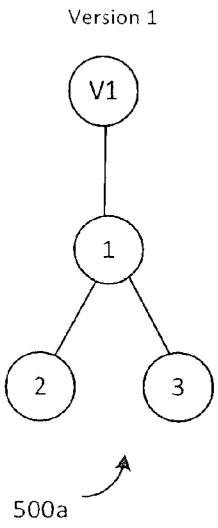
FIGS. 5A-5C are graphical representations of exemplary DOM node trees corresponding to versions of a structured document according to an exemplary embodiment.

As stated above, the DOM construct can be used to graphically represent a structured document as a node tree. In such a structure, each node represents an element or object of the structured document and when arranged in the node tree, graphically represent the hierarchical relationships between the objects of the structured document. For example, FIG. 5A depicts a traditional node tree 500*a* that can graphically represent the following exemplary structured document:

```
<V1>
  <1:PERSON>
    <2:NAME> JOHN </2:NAME>
    <3:CITY> NEW YORK </3:CITY>
  </:1PERSON>
</V1>
```

The exemplary structured document 430 includes a Root object represented by Node V1, a Person object represented by Node 1, a Name object represented by Node 2, and a City object represented by Node 3. The node tree 500*a* graphically indicates that Node 1 corresponding to the Person object is a parent node that has two (2) child nodes corresponding to the Name and City objects respectively. As shown, the node tree 500*a* captures and represents not only the objects of the structured document 430 but also the document's hierarchical context.

According to an embodiment, the vNode manager component 312 can be configured to parse the structured document 430*a* into its component objects, and to generate a vNode 600 for each object. In an embodiment, a vNode 600 corresponding to an object can be similar to a standard node defined by the DOM construct. For example, it can include information identifying the node, e.g., a node ID, and information identifying a parent node, a child node, and/or a next sibling node. Unlike the standard node, however, the vNode 600 further includes versioning information associated with a version of the structured document in which the object is first detected.

FIG. 6A is a block diagram illustrating an exemplary vNode according to an embodiment. In particular, the illustrated vNode 600*a* corresponds to Node 2 in the node tree 500*a* illustrated in FIG. 5A, which represents the "Name" object of the exemplary structured document 430 provided earlier. As is shown, the vNode 600*a* includes information identifying the vNode 602, and versioning information 610 associated with the version of the structured document 430 in which the corresponding object originates or is first detected. In an embodiment, the versioning information 610 can include a start date or check-in date 612 and optionally a version identifier ("vID") of the originating structured document, an end date 614 associated with a date when the object is no longer detected in a version of the structured document and optionally the vID of that document, the version identifier (version ID) 616 identifying the version of the originating structured document, and a creator name 618 of the originating structured document. In addition, versioning information 610 can include information identifying other related nodes. For example, the vNode 600*a* can include information identifying a parent node 624, a first child node 622, and a next sibling node 626. In an embodiment, information identifying a related node includes information identifying a version of the structured document in which the relationship was first detected.

Accordingly, the vNode 600*a* corresponding to the Name object "John" of the first version 430*a* of the exemplary structured document indicates that the Name object "John" is first detected in the first version of the structured document 430*a*, which was checked-in on the start date 612, Jan. 1, 2001. The vNode 600*a* also indicates that the Name object "John" was removed from the fourth version of the structured document 430, which was checked-in on the end-date 614 Apr. 1, 2001. In an embodiment, when an object exists in a most current visible version of the structured document 430, referred to as a "head" version, the vNode's end-date is unbounded or undetermined. Thus, for example, in FIG. 6B, the vNode 600*b* representing a vNode 5 includes an end-date 614 corresponding to an unbounded date of "infinity," which indicates that vNode 5 exists in a head version of the structured document 430.

Referring again to FIG. 6A, the vNode 600*a* indicates that, in the first version 430*a* of the structured document, the vNode's parent is vNode 1 and that its next sibling is vNode 3. vNode 1 corresponds to the "Person" object and vNode 3 corresponds to the "City" object. Because of the flexible storage structure of the vNode 600, other types of information and versioning information known to those skilled in the art can be included in the vNode 600. Therefore, the content of the vNode 600 includes, but is not limited to, the information described above.

Referring again to FIG. 2, in block 206, the plurality of vNodes 600 are stored in a data store 320, wherein the plurality of vNodes 600 collectively represent the first version 430*a* of the structured document. A system for managing versioned structured documents includes a data manager component 316 configured to store the plurality of vNodes 600 generated by the vNode manager component 312 in the data store 320 of the DBMS 300 hosted by the database server 402. For example, in an embodiment, when the vNodes 600 of the first version 430*a* of the structured document are generated, the vNode manager 312 can invoke the data manager 316 to create a data structure in the data store 320 corresponding to the structured document 430. The generated vNodes 600 of the first version 430*a* of the structured document can then be stored in the data structure corresponding to the versioned structured document 430.

Referring again to FIG. 2, in block 208, a next version of the structured document including a modification to a first object of the first version of the structured document is received. In an embodiment, the command handler component 308 in the system 300 for managing versioned structured documents can be configured to receive the next version of the structured document 430*b*, wherein the next version includes a modification to a first object of the first version of the structured document.

According to an embodiment, a user of a client device, e.g., Client B 400*b*, can "check-out" or retrieve the first version 430*a* of the structured document from the database server 402 and modify the first version 430*a* to create the next version 430*b* of the structured document. To "check-in" this version, the next version 430*b* can be included in a message transmitted from the client device 400*b* to the database server 402 over the network 440. The message can include a command to check-in or store the document 430*b* in the data store 320. As described above, the command handler component 308 in the DBMS 300 can be configured to receive the message including the next version 430*b* of the structured document from client B 400*b* via a network subsystem 302 and optionally an application protocol layer 304.

In an embodiment, when the command handler 308 receives the next version 430*b*, it routes the document 430*b* to the vNode manager component 312, which is configured to parse the document 430*b* into its objects, and to determine which object of the first version is modified. For example, in an embodiment, the vNode manager component 312 can be configured to execute a well known difference algorithm to determine how the first version 430*a* of the structured document is modified by the second version 430*b.*

In an embodiment, the modification to the first object can be adding a child object to the first object, removing the first object, and/or replacing the first object with a new object. For example, when the structured document 430 is a contacts list, the next version 430*b* of the structured document can include additional contact entries and/or corrections to existing contact entries. In addition, the next version 430*b* can have fewer contacts by removing contacts from the first version 430*a*. Consider again, for example, the exemplary structured document provided above, a next version of that structured document 430*b* can be as follows:

```
<V2>
<5:PERSON>
  <2:NAME> JOHN </NAME>
  <4:CITY> LONDON </CITY>
</5:PERSON>
<N2>
```

Figure 5B:
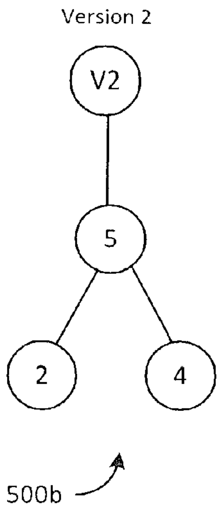

FIG. 5B depicts an exemplary traditional node tree 500*b* that graphically represents the next version 430*b* of the exemplary structured document. In this example, the City object "New York" is replaced with a new City object "London." In FIG. 5B, the new City object "London" is represented by Node 4.

According to an embodiment, when the first object is replaced with a new object and/or when a new object is added to an existing object, the vNode manager component 312 can be configured to generate a new vNode corresponding to the new object that includes versioning information 610 associated with the next version 430*b* of the structured document. For example, the vNode 600 corresponding to the new City object "London" can include the version ID of the next version 430*b* of the structured document, its check-in date, information identifying: the vNode representing its parent, the vNode representing its first child, and the vNode representing its next sibling. Once generated, the new vNode 600 corresponding to the new object can be stored in the data structure associated with the versioned structured document 430 in the data store 320.

Alternatively and/or in addition, when the first object is removed in the next version 430*b* of the structured document, the first object no longer exists in the most current visible version of the structured document. In this case, the vNode manager component 312 can be configured to retrieve the vNode 600 corresponding to the removed first object and to update the versioning information 610 to indicate that the first object has been removed. For example, FIG. 6E illustrates an exemplary vNode 600*e* corresponding to the City object "New York," which no longer exists in the next version 430*b* of the structured document. In an embodiment, the vNode manager component 312 can be configured to update the end date value 614 from "infinity" to the check-in date of the next version 430*b* of the structured document, e.g., Feb. 1, 2001, to indicate that the object represented by the vNode 600*e* was removed on the end date 614. Optionally, the version identifier of the next version 430*b* can also be included.

In the example above, although only one object is modified, other objects are impacted because of the hierarchical nature of the document. For example, replacing the City object "New York" necessarily results in modifying its parent, the Person object represented by Node 1, because the Person object no longer has the City object "New York" represented by Node 3 as a child object, but rather, has a new child object represented by Node 4. Similarly, all other ancestor(s) of the City object "New York", e.g., the root object represented by Node V1, are modified because each ancestor object no longer has the City object "New York" represented by Node 3 as a descendant object.

In addition, unchanged sibling objects of the modified object are affected as well. For example, the Name object "John" represented by Node 2 is affected when its next sibling City object "New York" is replaced with the new City object "London" because the Name Object "John" no longer has the City object "New York" represented by Node 3 as a next sibling object. Rather, it has a new next sibling City object "London" represented by Node 4.

Figure 7A:
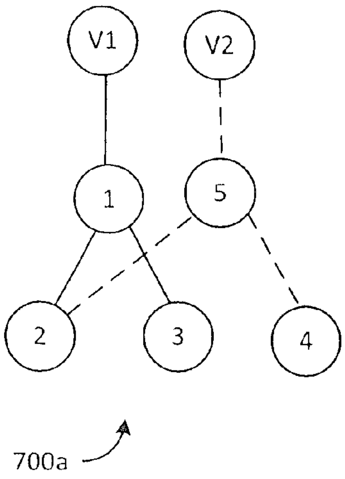
FIGS. 7A and 7B are graphical representations of exemplary versioned DOM node trees according to exemplary embodiments.

These complexities and nuances presented when managing versioned documents can be modeled by the vDOM construct. According to the vDOM construct, distinct node trees, e.g., 500*a*, 500*b*, representing different versions of the structured document 430 can be merged into a single vDOM node tree that allows vNodes to be shared across multiple versions of the structured document 430 while preserving the hierarchical relationships between the vNodes 600. FIG. 7A depicts an exemplary vDOM node tree according to an embodiment.

In this example, the vDOM node tree 700*a* represents the first 430*a* and next 430*b* versions of the exemplary structured document described above, and is a merger of the node trees 500*a*, 500*b* depicted in FIGS. 5A and 5B respectively. The first version of the structured document 430*a* is represented by Node V1, and Nodes 1-3 connected with solid lines, and the next version of the structure document 430*b* is represented by Node V2 and Nodes 2, 4 and 5 connected with broken lines. Node 2 is shared across the first 430*a* and next 430*b* versions of the structured document.

Referring again to FIG. 2, in block 210, a sharable object of the first version 430*a* of the structured document is identified based on a hierarchical relationship between the sharable object and an ancestor of the modified first object. In an embodiment, the vNode manager component 312 can be configured to identify the sharable object based on a hierarchical relationship between the sharable object and an ancestor of the modified first object.

According to an embodiment, whether a vNode 600 is shared is determined based on its hierarchical relationship with the vNode 600 representing the modified object. In an embodiment, a shared vNode can be one that represents a child of an ancestor of the modified object, and which is not itself an ancestor of the modified object. Accordingly, in an embodiment, once the first object of the first version 430*a* corresponding to the modification is determined, the vNode manager component 312 can be configured to identify, in an embodiment, one or more ancestor objects of the first object. For example, referring again to the exemplary first 430*a* and next 430*b* versions of the structured document described above and their respective node trees 500*a*, 500*b*, the City object "New York" represented by Node 3 is the modified first object and its ancestors include the Person object represented by Node 1, and the root object represented by Node V1.

Once an ancestor(s), e.g., the Person object, is identified, the vNode manager component 312 can be configured to identify sharable object(s) based on a hierarchical relationship between the sharable object(s) and the ancestor(s). In an embodiment, a sharable object is one that is a child of an ancestor of the modified object and that is not itself another ancestor of the modified object. In other words, an object is sharable when its parent is an ancestor of the modified object and when the object itself is not an ancestor of the modified object. For example, in FIG. 5A, when the ancestor object is the Person object, the sharable object is the Name object "John" represented by Node 2.

According to an embodiment, when the one or more ancestor objects are identified, the vNode manager component 312 can be configured to generate a new ancestor vNode for each ancestor object. Accordingly, referring again to FIG. 5B, the vNode manager component 312 can generate new vNode 5 and new Node V2, which are nodes representing ancestor objects, e.g., parent and grandparent, of the modified first object in the next version 430*b* of the structured document. As such, in an embodiment, the new ancestor vNodes 600 include versioning information associated with the next version 430*b* of the structured document.

Referring again to FIG. 6B, an exemplary new ancestor vNode is illustrated according to an embodiment. The new ancestor vNode 600*b* corresponds to new Node 5 in the node tree 500*b* illustrated in FIG. 5B. As is shown, the new ancestor vNode 600*b* includes information identifying the vNode, e.g., Node 5 <Person>, and versioning information 610 associated with the version of the structured document in which the object originates. In an embodiment, the versioning information indicates, among other things, when the new ancestor vNode 600*b* was generated, i.e., the start date or check-in date of the originating structured document, the version ID of the originating structured document, and information identifying related nodes. Thus, the new ancestor vNode 600*b* indicates that in Version 2 of the structured document 430, the first child node of Node 5 is Node 2, the parent node is Node V2, and a next sibling node is not detected.

Once generated, the new ancestor vNode, e.g., Node 5 600*b*, represents the ancestor object, e.g., the Person object, in the next version 430*b* of the structured document. The new ancestor vNode 600*b* is stored in the data store 320 along with the other vNodes 600 generated earlier. By generating new ancestor vNodes 600*b* for each ancestor of the modified object, the version context of the resulting vDOM node tree, e.g., 700*a*, can be preserved. Preserving the version context while sharing vNodes enables navigation through each version of the structured document using the vDOM node tree.

Referring again to FIG. 2, when the sharable object is identified, a vNode 600 representing the identified sharable object is updated to include versioning information 610 associated with the next version 430*b* of the structured document in block 212. In an embodiment, by including versioning information 610 associated with the first version 430*a* and the next version 430*b* of the structured document, the updated vNode is shared between the first version 430*a* and the next version 430*b* of the structured document 430. The vNode manager component 312 in the DBMS 300 hosted by the database server 402 can be configured to update the vNode representing the identified sharable object in an embodiment.

As described above, a sharable object of the first version of the structured document 430*a* is the child of an ancestor of the modified object and is not itself another ancestor of the modified object. Accordingly, an ancestor of the modified object is also a parent of a sharable object. As described above, the vNode manager component 312 generates a new ancestor vNode 600*b* for each ancestor of the modified object that includes versioning information 610 associated with the next version 430*b* of the structured document. In an embodiment, the vNode manager component 312 can be configured to update the vNode 600 corresponding to the sharable object by adding versioning information 610 identifying the new ancestor vNode as an additional parent vNode.

In addition, as noted above, when the modified object is replaced by a new object, a new vNode corresponding to the new object is generated as well. When the modified object is a next sibling of the sharable object in the first version 430*a* of the structured document and the vNode includes information identifying the vNode corresponding to the modified object as the next sibling vNode, the vNode manager component 312 can be configured to update the vNode 600 corresponding to the sharable object by adding versioning information 610 identifying the new vNode corresponding to the new object of the next version 430*b* of the structured document.

FIG. 6C depicts an updated vNode 600*c* corresponding to a sharable object according to an exemplary embodiment. In particular, FIG. 6C depicts an updated vNode 600*c* corresponding to Node 2 in FIG. 5B. As is shown, the updated vNode 600*c* includes information identifying Node 1 as a parent in the first version 430*a* of the structured document, and Node 5 as a parent in the second version 430*b* of the structured document. In addition, the updated vNode 600*c* includes information identifying Node 3 as a first next sibling in version one (1) 430*a* of the structured document, and Node 4 as a next sibling in version two (2) 430*b* of the structured document. Because the updated vNode 600*c* corresponding to the sharable object includes versioning information 610 associated with the first 430*a* and second 430*b* versions of the structured document, the updated vNode 600*c* is shared across the first 430*a* and second 430*b* versions of the structured document 430.

According to an embodiment, after new vNodes are generated, e.g., 600*b*, and existing vNodes are updated, e.g., 600*c*, 600*e*, the vDOM construct provides a model and interface for graphically representing the multiple versions of the structured document 430 in a vDOM node tree comprising the plurality of vNodes 600. Referring again to FIG. 7A, the illustrated vDOM node tree 700*a* represents the first 430*a* and next 430*b* versions of the exemplary structured document 430. As noted above, Node 2 represents a sharable object and this feature is graphically illustrated in the vDOM node tree 700*a*.

As additional versions of the structured document 430 are submitted, additional vNodes can be generated and existing vNodes can be updated. Each version, and its respective modifications, can be captured and presented in the vDOM node tree. For example, another version, e.g., version three (3), of the structured document 430 can be as follows:

```
<V3>
<7:PERSON>
  <2:NAME> JOHN </2:NAME>
  <6:CITY> BEIJING </6:CITY>
</7:PERSON>
</V3>
```

Figure 5C:
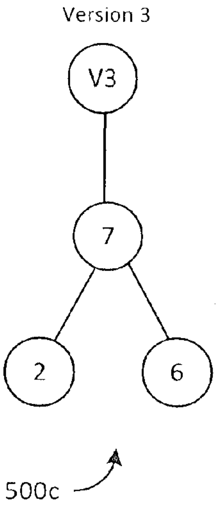

FIG. 5C depicts an exemplary node tree 500*c* that graphically represents version three (3) of the exemplary structured document 430. In this example, the City object "London" is replaced with a new City object "Beijing." In FIG. 5C, the new City object "Beijing" is represented by Node 6. When version three (3) is checked-in, the vNode manager component 312 can be configured to process the structured document 430 by generating new ancestor vNodes and new object vNodes, and updating vNodes corresponding to the removed object(s) and to sharable object(s). For example, the updated vNode illustrated in FIG. 6D represents Node 2 in FIG. 5C. The updated vNode 600*d* indicates that, in version three (3) of the structured document 430, its parent is Node 7 and its next sibling is Node 6.

Figure 7B:
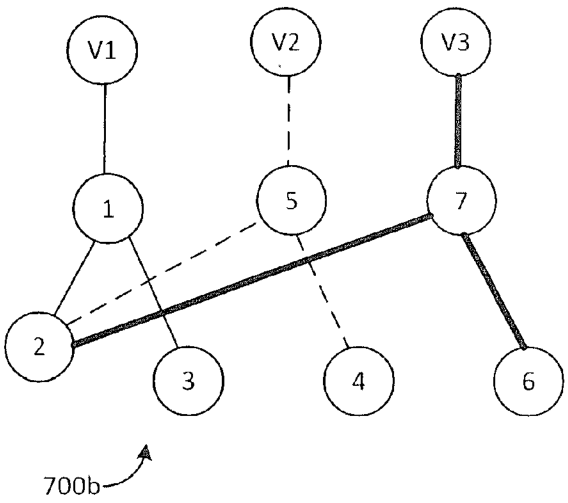

FIG. 7B depicts an exemplary vDOM node tree 700*b* that represents the first, second and third versions of the structured document 430 according to an embodiment. The illustrated vDOM node tree 700*b* merges the nodes trees 500*a*, 500*b*, 500*c* depicted in FIGS. 5A-5C respectively, and explicitly illustrates how Node 2 is shared across each version. Moreover, the vDOM node tree 700*b* graphically illustrates the hierarchical relationships between the vNodes 600 across the various versions so that version sensitive searching and navigation through the node tree 700*b* is allowed.

Moreover, the vDOM node tree 700*b* also illustrates effectively the storage benefits resulting from utilizing the vDOM construct. For example, each version of the simple structured document 430 described above includes four (4) objects represented by four (4) nodes. If stored independently, 12 nodes would be required to represent the three versions. In comparison, the three versions are represented accurately with ten (10) vNodes in the vDOM construct. Accordingly, in this simple case, two (2) fewer nodes are generated and stored in the data store 320. The space savings become more dramatic when the structured document 430 includes more objects and when more versions of such documents are stored.

As stated and shown above, the vNodes 600 of a versioned structured document 430 can be stored in a database that is managed by an XML DBMS. Typically, users can retrieve documents and/or their content by submitting a query to the XML DBMS. The query received and processed by the standard XML DBMS conforms to an open standard language construct known as "XQuery" specified by the World Wide Web Consortium ("W3C") XML Query Recommendations. XQuery, however, does not support version specific functionality.

According to an embodiment, to overcome this deficiency, a versioned function ("vFunction") can be provided to support querying over versioned structured documents 430 stored in the database. In an embodiment, the vFunction is an extension of XQuery, where the function includes at least one argument relating to versioning information of a versioned structured document. By providing the vFunction, the vXML DBMS 300 can be configured to perform a version-specific search to identify at least one version of the structured document 430 satisfying the argument(s) of the vFunction.

Figure 8:
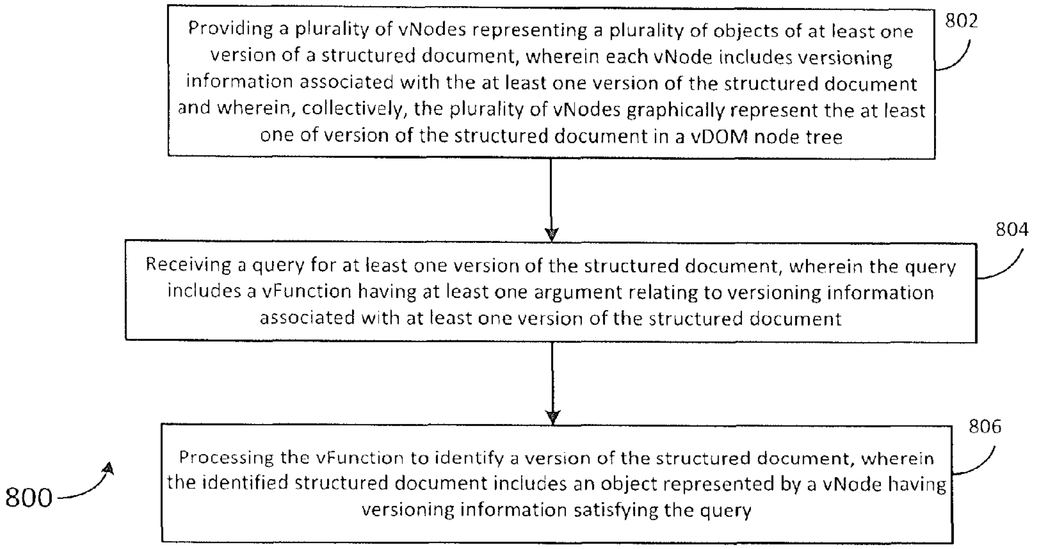
FIG. 8 is a flow diagram illustrating an exemplary method for providing a query for searching over versions of a structured document according to an exemplary embodiment.

Referring now to FIG. 8, a flow diagram is presented illustrating a method for providing a query for searching over versions of a structured document according to an embodiment. The method 800 illustrated in FIG. 8 can be carried out by, for example, at least some of the components in the exemplary arrangement of components illustrated in FIG. 3, which may be implemented by some or all of the components of the physical or virtual hardware device 100 of FIG. 1.

As described above, and illustrated in block 802, a plurality of vNodes 600 representing a plurality of objects of at least one version of a structured document 430 are provided. As stated above, each vNode 600 includes versioning information associated with at least one version of the structured document 430 and, collectively, the plurality of vNodes 600 graphically represent one or more versions of the structured document 430 in a vDOM node tree, e.g., 700*b*.

In block 804, a query for at least one version of the structured document is received, wherein the query includes a vFunction having at least one argument relating to versioning information associated with at least one version of the structured document. According to an embodiment, a system for managing versioned structured documents includes means for receiving the query. For example, the query handler component 314 in the DBMS 300 illustrated in FIG. 3, can be configured to receive the query 410 for at least one version of the structured document 430, wherein the query 410 includes a vFunction 412 having at least one argument relating to versioning information associated with at least one version of the structured document 430.

According to an embodiment, the query 410 can be included in a message transmitted from a client device, e.g., client C 400*c*, to the database server 402 over the network 440. The message can include a command to retrieve versioned document(s) 430 from the data store 320. In an embodiment, the command handler component 308 in the DBMS 300 can be configured to receive the message including the query 410 from client C 400*c* via the network subsystem 302 and optionally an application protocol layer 304, and to route the query 410 to the query handler 314.

According to an embodiment, when the query 410 is received, the query handler component 314 can be configured to parse the query 410 and to extract at least one vFunction 412 and optionally search criteria 416 relating to content of the structured document 430. The vFunction 412 in the query 410, according to an embodiment, includes at least one argument 414 relating to versioning information associated with at least one version of the structured document 430.

For example, a vFunction 412 can be a "document-at-date" vFunction that includes a "date-point" argument 414 that specifies a specific date that is related to versioning information associated with a version of the structured document 430. The "document-at-date" vFunction can be used to retrieve a version of the document 430 that exists on the specific date. For example, an exemplary query 410 that includes a "document-at-date" vFunction follows:

For $doc in document-at-date("/", $date-point as xs:dateTime("2001-01-01")) Where $doc//city[.contains text "New York"]

In this example, the query 410 also includes search criteria 416 relating to content in the structured document 430. In an embodiment, the exemplary query 410 seeks to identify a version of the document 430 that exists on Jan. 1, 2001 and that includes the content "New York" in a "City" object.

In another embodiment, the vFunction 412 can be a "document-at-date-range" vFunction that includes a "range-start-date" argument 414 that specifies a first date and a "range-end-date" argument 414 that specifies a second date, where the first and second dates define a date range related to versioning information associated with a version of the structured document 430. This vFunction 412 can be used to search for and retrieve one or more versions that exist or existed within the date range. In particular, the query 410 seeks to identify a version of the document 430 that exists on the first date and/or a version of the document 430 that is checked-in on a date between the first date and the second date.

In yet another embodiment, the vFunction 412 can be a "document-before-date" vFunction that includes a "date-point" argument 414 that specifies a specific date that is related to versioning information associated with a version of the structured document 430. This query 410 can be used to identify all versions of the versioned document 430 that exist or existed, i.e., are checked-in, on a date no later than the specific date. Additionally or alternatively, the vFunction 412 can be a "document-after-date" vFunction that includes a "date-point" argument 414 that specifies a specific date that is related to versioning information associated with a version of the structured document 430. This particular vFunction 412 can be used to identify all versions of the versioned document 430 that exist or existed, i.e., are checked-in, on a date no earlier than the specific date.

In an embodiment, the vFunction 412 can be used to identify and return versioning information 610 associated with a version of the structured document 430 identified by the query handler 314. For example, the vFunction 412 can be a "version-creator" vFunction, a "version-id" vFunction, or a "version-date" vFunction. These vFunctions 412 can be used to retrieve a creator name, an version identifier, and/or a check-in date, respectively, of the version of a structured document 430. For example, consider the following exemplary query 410 that includes a "version-id" vFunction 412:

For $doc in document-at-date("/", $date-point as xs:dateTime("2001-01-01")) Where $doc//city[.contains text "New York"]

Return <hit name="{document-uri($doc)}" version="{version-id($doc)}"/>

The exemplary query 410 can be used to identify a version of the document 430 that exists on Jan. 1, 2001 and that includes the content "New York" in a "city" object, and to retrieve the document's URI and version identifier.

In addition or alternatively, when a collection of structured documents 450 are stored in the data store 320, additional vFunctions 412 can be provided that cover, in an embodiment, the collection 450 of versioned documents 430. In this case, "collection" vFunctions 412 can be provided that are analogous to the vFunctions 412 described above for a particular versioned structured document 430. In an embodiment, a collection vFunction 412 can be used to identify all versions of all documents in the collection 450 that satisfy the collection vFunction 412.

Referring again to FIG. 8, when the query 410 is received, the vFunction 412 is processed, in block 806, to identify a version of the structured document 430, wherein the identified version of the structured document 430 includes an object represented by a vNode 600 having versioning information satisfying the query 410. In an embodiment, the query handler 314 in the DBMS 300 illustrated in FIG. 3 can be configured to process the vFunction 412 to identify a version of the structured document 430 that includes an object represented by a vNode 600 having versioning information satisfying the query 410.

Figure 8A:
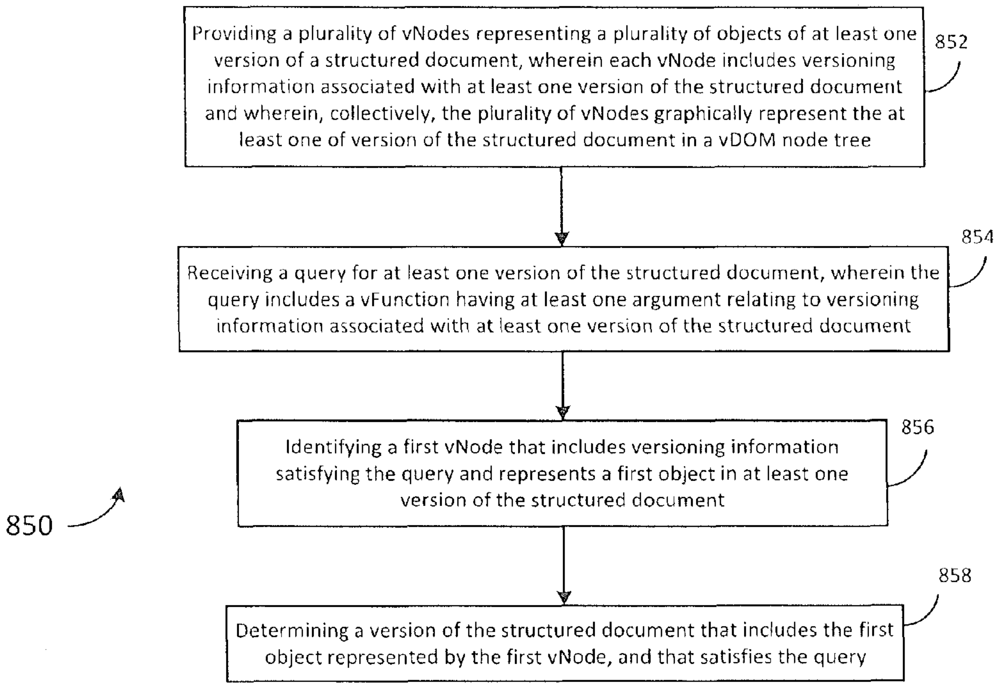
FIG. 8A is a flow diagram illustrating an exemplary method for processing a query for a versioned structured document according to an embodiment.

FIG. 8A is a flow diagram illustrating a method for processing a query 410 for a versioned structured document 430 according to an embodiment. The method 850 illustrated in FIG. 8A can be carried out by, for example, at least some of the components in the exemplary arrangement of components illustrated in FIG. 3, which may be implemented by some or all of the components of the physical or virtual hardware device 100 of FIG. 1. As described above, and illustrated in blocks 852 and 854, vNodes 600 are provided by the vNode manager 312 and a query 410 including a vFunction 412 is received by the query handler 314 in the DBMS 300.

In block 856, in response to receiving the query 410, a first vNode is identified that represents a first object in at least one version of the structured document 430 and that includes versioning information 610 satisfying the query 410. In an embodiment, the query handler 314 can be configured to identify a first vNode that represents a first object in at least one version of the structured document 430 and that includes versioning information 610 satisfying the query 410.

In an embodiment, the query handler 314 can be configured to identify the first vNode by scanning the versioning information 610 of vNodes 600. In an embodiment, the query handler 314 can invoke the data manager 316 to retrieve vNodes 600 associated with the structured document 430 so that the versioning information 610 of the retrieved vNodes 600 can be scanned. In an embodiment, a portion of the vNodes 600 can be retrieved based on the query 410. For example, when the query 410 includes search criteria 416 relating to content of the structured document 430, the query handler 314 can be configured to invoke the data manager 316 to retrieve a subset of vNodes 600 comprising "leaf" vNodes 600, i.e., nodes that have content in a first child text node. For example, FIG. 6A and FIG. 6E illustrate exemplary leaf vNodes 600*a*, 600*e* where the Node ID 602 of the leaf vNode 600*a*, 600*e* can include its content. In another embodiment, the query 410 can include search criteria 416 relating to a type of vNode, e.g., a parent vNode. In this case, only vNodes of the type requested are retrieved.

In an embodiment where the query 410 includes search criteria 416 relating to content of the structured document 430 and leaf vNodes 600*a*, 600*e* are retrieved, the query handler 312 can be configured to compare, for each leaf vNode, e.g., 600*a*, the content 602 of a leaf vNode 600*a* to the search criteria 416 of the query 410 to identify a matching vNode 600 that includes content 602 matching the search criteria 416 of the query 410. For example, in an exemplary query 410, the search criteria 416 of the query 410 can relates to the "name" object that includes the content "John." A scan of the leaf vNodes would identify a matching leaf vNode associated with vNode 2 600*a* because the Node ID 602 indicates that vNode 2 is a "name" object having content "John."

Once the matching vNode, e.g., 600*a*, is identified, the query handler 314 can be configured to determine, in an embodiment, whether the matching vNode 600*a* is a first vNode that includes versioning information 610 satisfying the query 410. For example, an argument 414 of the vFunction 412 can include a version identifier associated with a version of the document 430 that includes the content specified by the search criteria 416. In an embodiment, the query handler 314 can be configured to compare the version identifier 616 included in the versioning information 610 of the matching vNode 600*a* to the version identifier of the argument 414, and to determine, when the version identifiers match, that the matching vNode 600*a* is the first vNode, which includes versioning information 610 satisfying the query 410.

Alternatively, in an embodiment when the version identifiers do not match, the matching vNode 600*a* can still be determined to be the first vNode when the matching vNode's version identifier 616 refers to an earlier version of the structured document 430 that is before the version identified by the version identifier in the argument 414 of the vFunction 412 and when the matching vNode's end date 614 refers to a version of the structured document 430 after the version identified by the argument 414. Thus, for example, when the argument 414 includes a version identifier associated with a third version of the document 430, the matching vNode 600*a* is a first vNode because according to the versioning information 610, the object associated with the matching vNode 600*a* exists in the first, second, and third versions of the document 430.

Referring again to FIG. 8A, in block 858, when the first vNode is identified, a version of the structured document is determined that includes the first object represented by the first vNode, and that satisfies the query. In an embodiment, the query handler 314 can be configured to determine a version of the structured document 430 that includes the first object represented by the first vNode, and that satisfies the query 410.

According to an embodiment, once the first vNode, e.g, 600*a*, is identified, the query handler 314 can be configured to determine at least one version of the structured document 430 that includes the first object represented by the first vNode 600*a*. For example, in an embodiment, the query handler 314 can be configured to traverse the vDOM node tree, e.g., 700*b*, associated with the structured document 430 from the first vNode 600*a* to at least one root vNode, e.g., Node V1, corresponding to at least one version of the structured document 430 that includes the first object represented by the first vNode 600*a*. For example, when the first vNode refers to a first parent vNode in a first version 430*a* of the structured document, and refers to a second parent vNode in a second version 430*b* of the structured document, traversing the vDOM node tree from the first vNode 600*a* will result in two paths; a first path terminating at a first root node corresponding to the first version 430*a* of the structured document, and a second path terminating at a second root node corresponding to the second version 430*b* of the structured document.

To ensure that the appropriate version path is being followed when traversing the vDOM node tree 700*b*, the query handler 314 can be configured to select a VersionContext object that indicates which of the versions of the document 430 is being traversed. In an embodiment, the query handler 314 can navigate from the first vNode to a first parent vNode, which is the parent in the first version of the structured document, and can set the VersionContext object on the first parent vNode so that navigation can continue on the path associated with the first version of the structured document 430. Thereafter, the query handler 314 can be configured to navigate from the first parent vNode to the root vNode via at least one other first ancestor vNode, setting the VersionContext object on each of the first ancestor vNodes as it traverses the vDOM node tree 700*b*.

According to an embodiment, once the version(s) of the structured document 430 that include the first object represented by the first vNode have been determined, the query handler 314 can be configured to determine whether the identified version(s) satisfies the query 410. For example, for a first identified version, the query handler 314 can be configured to compare the check-in date of the first identified version to the argument(s) 414 of the vFunction 412 and to determine that the first identified version satisfies the query 410 when the check-in date satisfies the argument(s) 414 of the vFunction 412.

For example, when the vFunction 412 is a "document-at-date" function and the at least one argument 414 of the vFunction is a "date-point" argument that specifies a specific date, the first identified version of the structured document 430 satisfies the query 410 when the check-in date is either on or before the specific date, and no other identified version of the structured document has a check-in date later than the check-in date of the first identified version and before the specific date. In another example, the vFunction 412 can be a "document-at-date-range" function and the at least one argument 414 of the vFunction 412 can be a "range-start-date" argument that specifies a first date and a "range-end-date" argument that specifies a second date. In this case, the first identified version of the structured document 430 satisfies the query 410 when the check-in date is on the first date, on the second date, or between the first date and the second date.

According to an embodiment, once a version(s) of the structured document 430 that satisfies the query 410 is identified, it can be retrieved from the data store 320 and returned to a requesting entity, e.g., Client C 400*c*. In an embodiment, the query handler component 314 can be configured to retrieve the identified version(s) and to generate a reply message that includes the version(s) of the structured document 430 and/or an identifier identifying the version of the structured document 430 satisfying the query 410. The reply message can then be transmitted to Client C 400*c* over the network 440.

Figures 9, 10:
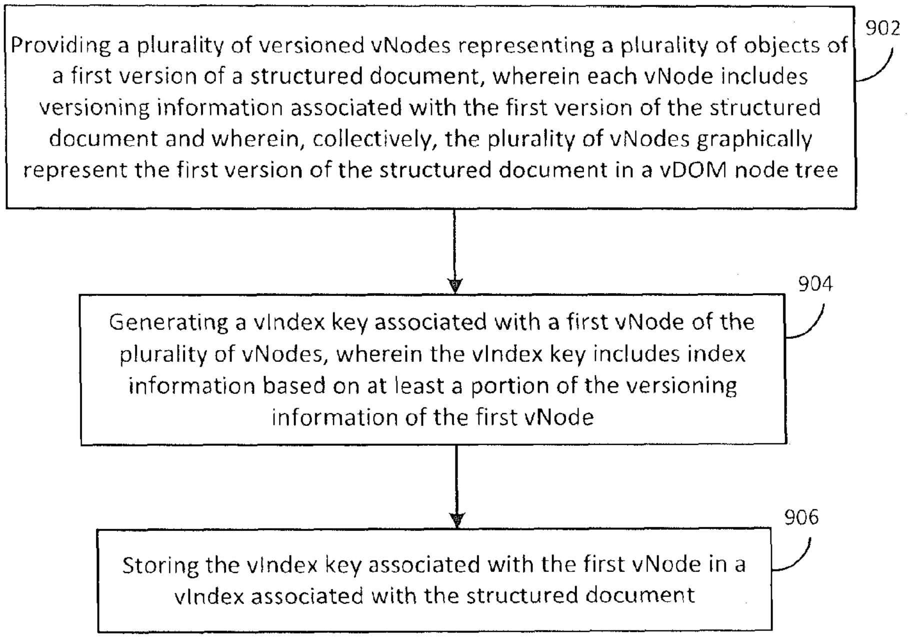
FIG. 9 is a flow diagram illustrating an exemplary method for providing a versioned index for searching multiple versions of a structured document according to an exemplary embodiment.
FIG. 10 is a block diagram illustrating an exemplary versioned index for multiple versions of a structured document according to an embodiment.

As stated above, the query handler 314 can be configured to scan the versioning information 610 of a plurality of vNodes 600 to determine one or more matching vNodes 600. This process, however, can be costly and inefficient because the query handler 314 must invoke the data manager 316 to retrieve vNodes 600 from the data store 320. In order to facilitate efficient version-based searching a versioned index ("vIndex") can be provided. FIG. 9 is a flow diagram illustrating a method for indexing a versioned structured document 430 according to an exemplary embodiment. The method 900 illustrated in FIG. 9 can be carried out by at least some of the components in the exemplary arrangement of components illustrated in FIG. 3.

As described above, and illustrated in block 902, a first plurality of vNodes 600 representing a plurality of objects of a first version 430*a* of a structured document is provided. As described above, each vNode 600 includes versioning information 610 associated with the first version 430*a* of the structured document and, collectively, the first plurality of vNodes 600 graphically represent the first version 430*a* of the structured document in a vDOM node tree. The vNodes 600 can be generated by the vNode manager component 312 in a manner described above and the vNodes 600 can be stored in the data store 320 in a data structure corresponding to the version structured document 430.

In block 904, a versioned index ("vIndex") key associated with a first vNode, e.g., 600*a*, of the plurality of vNodes is generated, wherein the vIndex key includes index information based on at least a portion of the versioning information 610 of the first vNode 600*a*. According to an embodiment, a system for managing versioned structured documents includes means for generating the vIndex key. For example, an indexing engine 310 in the DBMS 300 illustrated in FIG. 3, can be configured to generate the vIndex key associated with the first vNode 600*a* of the plurality of vNodes 600, wherein the vIndex key includes index information based on at least a portion of the versioning information 610 of the first vNode 600*a*.

According to an embodiment, once the vNode manager 312 generates the vNodes 600 associated with the first version 430*a* of the structured document 430, the vNodes 600 can be provided to the indexing engine 310, which is configured to scan them to identify vNodes, e.g., 600*a*, that should be indexed. For example, in an embodiment, the indexing engine 310 can be configured to index "leaf" vNodes 600, i.e., nodes that have content in a first child text node. When the indexing engine 310 identifies a first vNode to be indexed, e.g., vNode 600*a*, the indexing engine 310 can be configured to generate a vIndex key that includes index information based on at least a portion of the versioning information 610 of the first vNode 600*a*.

FIG. 10 is a block diagram illustrating an exemplary vIndex 950 according to an embodiment. The vIndex 950 includes a plurality of vIndex keys 970 associated with indexed vNodes 600 in at least one version of the structured document 430. Each vIndex key 970 includes index information 960. In an embodiment, the index information 960 can include, for example, content 962 of a first child text node, a vNode identifier 964, and versioning information 610 including the start-date 966 and optionally the version ID associated with the originating version, and the end-date 968 and optionally the version ID associated with the version in which the object represented by the vNode 600*a* no longer exists. Thus, for example, according to the vIndex 950, a first vIndex key 970*a* is associated with the first vNode 600*a* identified as vNode 2, which includes content "John," exists in a first, a second and a third version of the structured document 430, and is removed in a fourth version on Apr. 1, 2001. According to an embodiment, when an indexed vNode, e.g., vNode 5 600*b*, exists in the head version of the structured document 430, the associated vIndex key 970*e* includes an end-date 968 with an unbounded date, e.g., "infinity," to indicate that the end-date is undetermined.

According to an embodiment, the start-date 966 and the end-date 968 of the index information 960 can be scaled by a scaling factor in order to minimize storage requirements of storing exact start 966 and end 968 dates. For example, instead of providing the exact start-date, the indexing engine 310 can be configured to determine a scaled start-date based on the exact start-date, where the scaled start-date is earlier and no later than the start-date. Similarly, the indexing engine 310 can be configured to determine a scaled end-date based on the exact end-date, where the scaled end-date is later and no earlier than the end-date. In an embodiment, either or both of the scaled start-date and the scaled end-date can be included as index information 960 of the vIndex key, e.g., 970*c*, associated with an indexed vNode 600. For example, the vIndex 950 illustrated in FIG. 10 includes another vIndex key 970*c* that includes a scaled start-date and a scaled end-date, which indicate that the corresponding vNode, e.g., vNode 4, was first detected on some date on or after Jan. 1, 2001 and was removed on some date on or before Jun. 1, 2001.

Referring again to FIG. 9, when the vIndex key 970 associated with the first vNode is generated, the vIndex key 970 is stored in a vIndex 950 associated with the structured document 430 in block 906. According to an embodiment, the vIndex 950 can be stored in the data store 320 and the indexing engine 310 can be configured to invoke the data manager component 316 to store the vIndex key 970 in the vIndex 950.

In an embodiment, when a second version 430*b* of the structured document 430 is received, the vNode manager component 312 can be configured to generate new vNodes and/or to update existing vNodes based on the modifications included in the second version 430*b*. Because vNodes can be shared between multiple versions of the structured document 430, the new and/or updated vNodes and some of the unchanged existing vNodes can represent the objects of the second version 430*b* of the structured document 430. Accordingly, a second plurality of vNodes representing the second version 430*b* can include new vNodes, updated existing vNodes, and unchanged existing vNodes. In an embodiment, the second plurality of vNodes 600 representing the objects of the second version 430*b* of the structured document 430 can be provided to the indexing engine 310.

According to an embodiment, the indexing engine 310 can be configured to receive and scan the second plurality of vNodes 600 to identify which of them is eligible to be indexed, and of those, whether a new vIndex key 970 should be generated. In an embodiment, when an eligible vNode is identified, the indexing engine 310 can be configured to determine that the eligible vNode represents a new object detected for the first time in the second version 430*b* of the document 430 based on the versioning information 610 included in the eligible vNode. For example, when the start-date 612 or version ID 616 of the vNode correspond to the version of the scanned document, the indexing engine 310 can determine that the eligible vNode represents a new object. In this case, the indexing engine 310 can be configured to generate a new vIndex key, e.g., 970*e*, associated with the eligible vNode and to store the new vIndex key 970*e* in the vIndex 950 associated with the structured document 430.

According to another embodiment, the indexing engine 310 can be configured to receive and scan the second plurality of vNodes 600 to identify which of them is eligible to be indexed, and of those, whether an existing vIndex key 970 should be replaced with a new vIndex key. In an embodiment, for example, the vNode manager component 312 can update a vNode representing an object in response to receiving a new head version of the structured document 430 that removes the object represented by the updated vNode, e.g., 600*e*, from a previous head version. In this case, the updated vNode 600*e* can include updated versioning information 610 associated with the new head version of the structured document 430. For instance, due to the removal of the object, the vNode manager component 312 can be configured to update the end-date 614 from "infinity" to a date corresponding to a check-in date of the new head version, e.g., the second version 430*b*, of the structured document 430.

In an embodiment, when an updated vNode 600*e* representing a removed object is detected, the indexing engine 310 can be configured to identify, in the vIndex 950, an existing vIndex key 970 associated with the vNode 600*e* representing the removed object, for example, based on the Node ID 602 included in the vNode 600*e*. Once the existing vIndex key is identified, the indexing engine 310 can be configured to generate a new vIndex key, e.g., 970*b*, corresponding to the updated vNode 600*e* that includes index information 960 based on at least a portion of the updated versioning information 610 of the updated vNode 600*e*. For example, the index information 960 in the new vIndex key 790*b* can include the updated end-date 614 corresponding to the check-in date of the new head version of the document 430. In an embodiment, the indexing engine 310 can be configured to replace the existing vIndex key with the new vIndex key 970*b* corresponding to the updated vNode 600*e* in the vIndex 950 associated with the versioned structured document 430.

According to another embodiment, when a version of a structured document 430 is removed or made invisible, the indexing engine 310 can be configured to update the vIndex 650 by removing vIndex keys and/or updating existing vIndex keys. In an embodiment, when a version, e.g., the second version 430*b*, is removed, the vNode manager component 312 can be configured to remove and/or update vNodes 600 associated with the removed second version 430*b* of the structured document 430. For example, the vNode manager component 312 can remove a first vNode 600 that has a start-date 612 corresponding to the check-in date of the removed second version, and/or can update a second vNode 600 that has an end-date 614 corresponding to the check-in date of the removed version.

In an embodiment, the indexing engine 310 can be configured to receive an indication from the vNode manager component 312 that a particular version, e.g., the second version 430*b*, of the structured document 430 has been removed. In an embodiment, the indication can include the check-in date of the removed version. In response to receiving the indication, the indexing engine 310 can be configured to remove any vIndex key(s) having index information 960 that includes a start date 966 corresponding to the check-in date of the removed version 430*b* of the structured document 430. Alternatively or in addition, the indexing engine 310 can be configured, in an embodiment, to identify another vIndex key having index information 960 that includes an end date 968 corresponding to the check-in date of the removed version 430*b*. In an embodiment, the end date 968 can be updated to a date corresponding to a check-in date of a next visible version, e.g., a third version, of the structured document 430 immediately following the removed version 430*b*.

For example, referring to FIG. 10, the vIndex 950 indicates that at least five (5) versions of the structured document 430 exist. When the indexing engine 310 receives an indication that the fourth version has been removed or has been made invisible, the indexing engine 310 can be configured to remove the vIndex key 970*d* associated with vNode 6 because its start-date 966 corresponds to the check-in date of the removed fourth version. In addition or alternatively, the indexing engine 310 can be configured to update the vIndex key 970*a* associated with vNode 2 because its end-date 968 corresponds to the check-in date of the removed fourth version. In an embodiment, the end-date 968 of the vIndex key 970*a* can be updated to a date corresponding to the check-in date of the fifth version of the structured document 430, assuming that the fifth version immediately follows the fourth version, because the fourth version is no longer visible.

Figure 11:
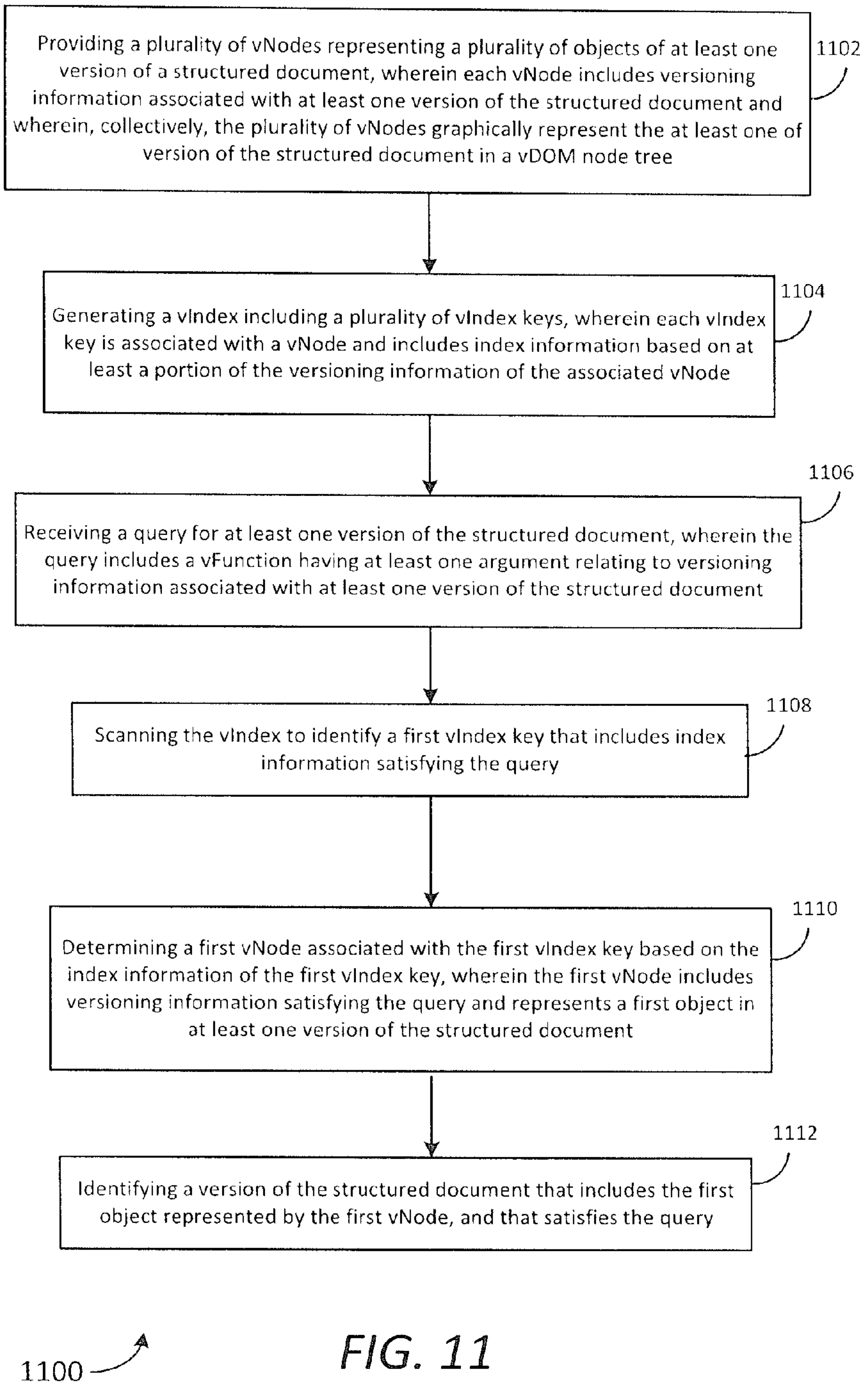
FIG. 11 is a flow diagram illustrating an exemplary method for processing a query using a versioned index according to an exemplary embodiment.

Once the vIndex 950 is provided, efficient version-based searching can be performed by the query handler 314 in the DBMS 300. FIG. 11 is a flow diagram illustrating a method for processing a query for a versioned structured document 430 according to an exemplary embodiment. The method 1100 illustrated in FIG. 11 can be carried out by at least some of the components in the exemplary arrangement of components illustrated in FIG. 3.

As described above, and illustrated in block 1102, a plurality of vNodes 600 representing a plurality of objects of at least one version of a structured document 430 are provided by, for example, the vNode manager component 312. Each vNode 600 includes versioning information 610 associated with at least one version of the structured document 430 and, collectively, the plurality of vNodes 600 graphically represent the at least one of version of the structured document 430 in a vDOM node tree, e.g., 700*b*.

In block 1104, a vIndex including a plurality of vIndex keys is generated by, for example, the indexing engine 310. As described above, each vIndex key 970 is associated with an indexed vNode 600 and includes index information 960 based on at least a portion of the versioning information 610 of the associated vNode 600.

In block 1106, a query 410 for at least one version of the structured document 430 is received by, for example, the query handler component 314 in the DBMS 300 illustrated in FIG. 3. As described above, the query 410 includes a vFunction 412 having at least one argument 414 relating to versioning information 610 associated with at least one version of the structured document 430 and optionally, search criteria 416 relating to content of the structured document 430.

In an embodiment, the query 410 can be included in a message transmitted from the client device 400*c* to the database server 402 over the network 440. The message can include a command to retrieve a version of a document 430 from the data store 320, and can be received and routed to the query handler component 314 via the command handler 308.

According to an embodiment, in response to receiving the query 410, the vIndex 650 is scanned to identify a first vIndex key 970 that includes index information 960 satisfying the query 410 in block 1108. In an embodiment, the query handler 314 in the DBMS 300 illustrated in FIG. 3 can be configured to scan the vIndex 650 to identify a first vIndex key 970 that includes index information 960 satisfying the query 410.

In an embodiment, when the message including the query 410 is transmitted to the database server 402, the command handler component 308 can be configured to receive the message, to extract the query 410 from the message and to route the query 410 to the query handler 314 based on the command included in the message. In an embodiment, the query handler 314 can be configured to parse the query 410 and to extract at least one vFunction 412 and optionally the search criteria 416 relating to content of the structured document 430.

According to an embodiment, the query handler 314 can be configured to process the query 410 by scanning the vIndex 650 to identify a first vIndex key 970 that includes index information 960 satisfying the query 410. In an embodiment, the query handler 314 can begin by comparing, for each vIndex key 970 in the vIndex 950, the index information 960 of a vIndex key with the search criteria 416 of the query 410 to identify a matching vIndex key 970 that includes index information 960 matching the search criteria 416 of the query. For example, in both of the exemplary queries provided above, the search criteria 416 of the query 410 relates to the "city" object that includes the content "New York." A scan of the vIndex 650 would identify a matching vIndex key associated with vNode 3 970*b* because the index information 960 indicates that vNode 3 is a "city" object having content "New York."

Once the matching vIndex key 970*b* is identified, the query handler 314 can be configured to determine, in an embodiment, whether the matching vIndex key 970*b* satisfies the argument(s) 414 of the vFunction 412. In an embodiment, the query handler 314 can be configured to compare the start date 966 and/or the end date 968 included in the index information 960 of the matching vIndex key 970*b* to the argument(s) 414 of the vFunction 412. Depending on the vFunction type, the matching vIndex key 970*b* is the first vIndex key that satisfies the query 410 when the start date 966 and/or the end date 968 satisfy the vFunction 412.

For example, both of the exemplary queries include a "document-at-date" vFunction 412 that has a "date-point" argument 414 specifying Jan. 1, 2001. In this example, the vIndex key associated with vNode 3 970*b* is the first vIndex key that satisfies both of the exemplary queries because the start-date 966 is Jan. 1, 2001, which indicates that a version of the structured document 430 that includes the object represented by vNode 3 exists or existed on Jan. 1, 2001.

Referring again to FIG. 11, once the first vIndex key is identified, a first vNode associated with the first vIndex key is determined based on the index information 960 of the first vIndex key in block 1110. In an embodiment, the first vNode includes versioning information 610 satisfying the query 410 and represents a first object in at least one version of the structured document 430.

According to an embodiment, the query handler 314 can be configured to determine the first vNode associated with the first vIndex key based on the index information 960 of the first vIndex key. For example, as described above, the index information 960 of a vIndex key 970 includes, in an embodiment, a node identifier 964 identifying the vNode 600 associated with the vIndex key 970. Accordingly, determining the first vNode associated with the first vIndex key 970*b* can include, in an embodiment, mapping the node identifier 964 in the index information 960 of the first vIndex key 970*b* to the first vNode 600*e*.

Referring again to FIG. 11, when the first vNode associated with the first vIndex key is determined, a version of the structured document that includes the first object represented by the first vNode, and that satisfies the query is identified in block 1112. In an embodiment, the query handler 314 can be configured to identify a version of the structured document 430 that includes the first object represented by the first vNode, and that satisfies the query 410.

As described above in relation to block 858 of FIG. 8A, the query handler 314 can be configured to identify at least one version of the structured document 430 that includes the first object represented by the first vNode 600*e* and that satisfies the query 410. For the sake of brevity, that description will not be repeated here, but rather is herein incorporated by reference in its entirety. To summarize that description, in an embodiment, the query handler 314 can be configured to traverse the vDOM node tree, e.g., 700*b*, associated with the structured document 430 from the first vNode 600*e* to at least one root vNode, e.g., Nodes V1, corresponding to at least one version of the structured document 430 that includes the first object represented by the first vNode 600*e*. As described in detail earlier, the VersionContext object can be used to ensure that the appropriate version path is being followed when traversing the vDOM node tree 700*b*. According to an embodiment, once the version(s) of the structured document 430 is identified, the query handler 314 can be configured to determine whether the identified version(s) satisfies the query 410 in the manner described above. Finally, once a version(s) of the structured document 430 that satisfies the query 410 is identified, it can be retrieved from the data store 320 and returned to a requesting entity, e.g., Client C 400*c*.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method for providing a query for searching versions of a structured document, the method comprising:

providing by a server a plurality of versioned nodes ("vNodes") representing a plurality of objects of at least one version of a structured document, wherein each vNode includes versioning information associated with the at least one version of the structured document and wherein, collectively, the plurality of vNodes graphically represent the at least one version of the structured document in a versioned document object model ("vDOM") node tree, and wherein at least one vNode in the vDOM node tree is configured to have more than one parent node across multiple versions of the structured document;

receiving by the server a query for at least one version of the structured document, wherein the query includes a versioned function having at least one argument relating to versioning information associated with at least one version of the structured document; and processing by the server the versioned function to identify a version of the structured document, wherein the identified structured document includes an object represented by a vNode having versioning information satisfying the at least one argument of the versioned function.

2. The method of claim 1 wherein versioning information of a vNode comprises at least one of a start date corresponding to a check-in date of a version of the structured document in which the vNode is first detected, and an end date corresponding to a check-in date of another version of the structured document in which the vNode no longer exists in the structured document.

3. The method of claim 2 wherein the versioned function is a "document-at-date" function and the at least one argument of the versioned function is a "date-point" argument that specifies a specific date, and wherein the identified version of the structured document is a version that exists on the specific date, and that includes an object represented by a vNode satisfying the query.

4. The method of claim 2 wherein the versioned function is a "document-at-date-range" function and the at least one argument of the versioned function is a "range-start-date" argument that specifies a first date and a "range-end-date" argument that specifies a second date, and wherein the identified version of the structured document is a version that at least one of exists on the first date and is checked-in on a date between the first date and the second date, and that includes an object represented by a vNode satisfying the query.

5. The method of claim 2 wherein the versioned function is a "document-before-date" function and the at least one argument of the versioned function includes a "date-point" argument that specifies a specific date, and wherein the identified version of the structured document is a version that is checked-in on a date no later than the specific date, and that includes an object represented by a vNode satisfying the query.

6. The method of claim 2 wherein the versioned function is a "document-after-date" function and the at least one argument of the versioned function specifies a "date-point" argument that specifies a specific date, and wherein the identified version of the structured document is a version that is checked-in on a date no earlier than the specific date, and includes an object represented by a vNode satisfying the query.

7. The method of claim 1 wherein the versioning information comprises at least one of a creator name of a version of the structured document, an identifier of the version, and a version date corresponding to a check-in date of the version of the structured document.

8. The method of claim 7 wherein the query includes a "version-creator" versioned function associated with the creator name of the version of the structured document.

9. The method of claim 7 wherein the query includes a "version-id" versioned function associated with the identifier of the version of the structured document.

10. The method of claim 7 wherein the query includes a "version-date" versioned function the version date of the identified version of the structured document.

11. A system for providing a query for searching versions of a structured document, the system comprising:

a processor-based versioned node ("vNode") manager executed on a computer and configured to provide a plurality of versioned nodes (vNodes) representing a plurality of objects of at least one version of a structured document, wherein each vNode includes versioning information associated with the at least one version of the structured document and wherein, collectively, the plurality of vNodes graphically represent the at least one version of the structured document in a versioned document object model ("vDOM") node tree, and wherein at least one vNode in the vDOM node tree is configured to have more than one parent node across multiple versions of the structured document; and a processor-based query handler component executed on the computer and configured to receive a query for at least one version of the structured document, wherein the query includes a versioned function having at least one argument relating to versioning information associated with at least one version of the structured document, and to process the versioned function to identify a version of the structured document, wherein the identified structured document includes an object represented by a vNode having versioning information satisfying the at least one argument of the versioned function.

12. The system of claim 11 wherein versioning information of a vNode comprises at least one of a start date corresponding to a check-in date of a version of the structured document in which the vNode is first detected, and an end date corresponding to a check-in date of another version of the structured document in which the vNode no longer exists in the structured document.

13. The system of claim 12 wherein the versioned function is a "document-at-date" function and the at least one argument of the versioned function is a "date-point" argument that specifies a specific date, and wherein the identified version of the structured document is a version that exists on the specific date, and that includes an object represented by a vNode satisfying the query.

14. The system of claim 12 wherein the versioned function is a "document-at-date-range" function and the at least one argument of the versioned function is a "range-start-date" argument that specifies a first date and a "range-end-date" argument that specifies a second date, and wherein the identified version of the structured document is a version that at least one of exists on the first date and is checked-in on a date between the first date and the second date, and that includes an object represented by a vNode satisfying the query.

15. The system of claim 12 wherein the versioned function is a "document-before-date" function and the at least one argument of the versioned function includes a "date-point" argument that specifies a specific date, and wherein the identified version of the structured document is a version that is checked-in on a date no later than the specific date, and that includes an object represented by a vNode satisfying the query.

16. The system of claim 12 wherein the versioned function is a "document-after-date" function and the at least one argument of the versioned function specifies a "date-point" argument that specifies a specific date, and wherein the identified version of the structured document is a version that is checked-in on a date no earlier than the specific date, and includes an object represented by a vNode satisfying the query.

17. The system of claim 11 wherein the versioning information comprises at least one of a creator name of a version of the structured document, an identifier of the version, and a version date corresponding to a check-in date of the version of the structured document.

18. The system of claim 17 wherein the query includes a "version-creator" versioned function associated with the creator name of the version of the structured document.

19. The system of claim 17 wherein the query includes a "version-id" versioned function associated with the identifier of the version of the structured document.

20. A non-transitory computer-readable medium carrying one or more sequences of instructions for providing a query for searching over versions of a structured document, which instructions, when executed by one or more processors, cause the one or more processors to carry out the steps of:

providing by a server a plurality of versioned nodes (vNodes) representing a plurality of objects of at least one version of a structured document, wherein each vNode includes versioning information associated with the at least one version of the structured document and wherein, collectively, the plurality of vNodes graphically represent the at least one version of the structured document in a versioned document object model ("vDOM") node tree, and wherein at least one vNode in the vDOM node tree is configured to have more than one parent across multiple versions of the structured document;

receiving by the server a query for at least one version of the structured document, wherein the query includes a versioned function having at least one argument relating to versioning information associated with at least one version of the structured document; and processing by the server the versioned function to identify a version of the structured document, wherein the identified structured document includes an object represented by a vNode having versioning information satisfying the at least one argument of the versioned function.

* * * * *